US009135465B2

(12) United States Patent
Cheng et al.

(10) Patent No.: US 9,135,465 B2
(45) Date of Patent: *Sep. 15, 2015

(54) SYSTEM AND METHOD TO PROVIDE SERVER CONTROL FOR ACCESS TO MOBILE CLIENT DATA

(75) Inventors: Pau-Chen Cheng, Yorktown Heights, NY (US); Stephen C. Gates, Redding, CT (US); Lawrence Koved, Pleasantville, NY (US); Wilfried Teiken, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/570,816

(22) Filed: Aug. 9, 2012

(65) Prior Publication Data

US 2013/0232543 A1 Sep. 5, 2013

Related U.S. Application Data

(63) Continuation of application No. 13/555,905, filed on Jul. 23, 2012.

(60) Provisional application No. 61/605,792, filed on Mar. 2, 2012.

(51) Int. Cl.
*H04L 29/06* (2006.01)
*G06F 21/62* (2013.01)

(52) U.S. Cl.
CPC .................................. *G06F 21/6218* (2013.01)

(58) Field of Classification Search
CPC .................................................. G06F 21/6218
USPC ..................................................... 726/1, 4, 22
See application file for complete search history.

(56) References Cited

U.S. PATENT DOCUMENTS

| | | | |
|---|---|---|---|
| 7,827,597 B2 | 11/2010 | Boynton et al. | |
| 8,560,722 B2 * | 10/2013 | Gates et al. | 709/232 |
| 2006/0253420 A1 * | 11/2006 | Hinton et al. | 707/2 |
| 2007/0180257 A1 * | 8/2007 | Bae et al. | 713/182 |
| 2009/0164566 A1 * | 6/2009 | Kawai et al. | 709/203 |
| 2010/0211781 A1 | 8/2010 | Auradkar et al. | |
| 2011/0004941 A1 | 1/2011 | Mendez et al. | |
| 2011/0154050 A1 | 6/2011 | Cordery et al. | |
| 2011/0270748 A1 | 11/2011 | Graham, III et al. | |
| 2012/0036358 A1 | 2/2012 | Johnson et al. | |

OTHER PUBLICATIONS

Bertino, E., et al. "GEO-RBAC: A Spatially Aware RBAC" ACM Transactions on Information and System Security (TISSEC), vol. 10, Issue 1. Feb. 2007. pp. 1-39.

(Continued)

*Primary Examiner* — Jason Lee
(74) *Attorney, Agent, or Firm* — Tutunjian & Bittetto, P.C.; Anne V. Dougherty

(57) ABSTRACT

Systems and methods for protecting a data item include, upon initiation of transfer of the data item from a server to a client device, determining a sensitivity score and a current protection level of the data item. A policy is applied to determine an appropriate protection for the data item based upon the sensitivity score and the current protection level. A protected data item is provided to the client device by applying the appropriate protection to the data item.

23 Claims, 6 Drawing Sheets

(56) References Cited

OTHER PUBLICATIONS

Corner, M., et al. "Zero-Interaction Authentication" MobiCom '02 Proceedings of the 8th annual international conference on Mobile computing and networking. Sep. 2002. pp. 1-11.

Geambasu, R., et al. "KEYPAD: An Auditing File System for Theft-Prone Devices" EuroSys '11 Proceedings of the sixth conference on Computer systems. Apr. 2011. pp. 1-15.

Miettinen, M., et al. "Towards Security Policy Decisions Based on Context Profiling" AlSec '10 Proceedings of the 3rd ACM workshop on Artificial intelligence and security. Oct. 2010. pp. 19-23.

Studer, A., et al. "Mobile User Location-Specific Encryption (MULE): Using Your Office As Your Password" WiSec '10 Proceedings of the third ACM conference on Wireless network security. Mar. 2010. (12 Pages).

\* cited by examiner

SYSTEM AND METHOD TO PROVIDE SERVER CONTROL FOR ACCESS TO MOBILE CLIENT DATA

CROSS-REFERENCE TO RELATED APPLICATIONS

This application claims priority to U.S. Provisional Ser. No. 61/605,792 filed on Mar. 2, 2012 and incorporated herein by reference in its entirety.

This application is a Continuation application of co-pending U.S. patent application Ser. No. 13/555,905 filed on Jul. 23, 2012, incorporated herein by reference in its entirety.

BACKGROUND

1. Technical Field

The present invention relates to controlling access to data, and more particularly to providing server control for access to client data on a mobile device.

2. Description of the Related Art

Over the last few years, work environments have changed from an office-centric model to an increasingly mobile model in which employees access enterprise data remotely though various channels from a wide range of devices. In addition to access from laptops that connect to enterprise networks through encrypted channels, such as virtual private networks (VPNs), employees are increasingly using other mobile devices, such as smartphones or tablet computers. Such mobile devices create a significant risk of data loss due to accidental loss or theft. Mobile phones are especially at risk, as they are usually carried throughout the day, even in situations where other mobile devices, like laptops, are not typically carried.

Current approaches for preventing data loss include passwords for device access, redaction of information, and encryption of information. However, there exists a tradeoff between security and usability. For example, a device lock may be activated on a mobile phone after 15 minutes of inactivity. While 15 minutes may be too frequent in some situations (e.g., home), 15 minutes may be too long in others (e.g., public bar) to effectively prevent the loss of sensitive information. None of the present approaches for preventing data loss sufficiently address both security and usability of a mobile device.

SUMMARY

A method for protecting a data item includes, upon initiation of transfer of the data item from a server to a client device, determining a sensitivity score and a current protection level of the data item. A policy is applied to determine an appropriate protection for the data item based upon the sensitivity score and the current protection level. A protected data item is provided to the client device by applying the appropriate protection to the data item.

A method for protecting a data item includes, upon initiation of transfer of the data item from a server to a mobile device, determining a sensitivity score and a current protection level of the data item using a data protection server. A policy is applied to determine an appropriate protection for the data item using the data protection server, wherein the appropriate protection is based upon the sensitivity score, the current protection level, and features of at least one of the data item and the mobile device. A protected data item is provided to the mobile device by applying the appropriate protection to the data item using the data protection server.

A method for accessing a protected data item includes, responsive to a request to access the protected data item, determining a level of confidence that a user of a client device is an authorized user of the client device to determine eligibility of the user to access the protected data item. The level of confidence is based on one or more of a context of the client device, an authentication history of the client device, and an access history of the user of the client device. In accordance with the level of confidence, access to the protected data item is provided to the client device such that a level of confidence needed to access the protected data item is based upon a sensitivity score of the protected data item.

A method for accessing a protected data item includes, responsive to a request to access the protected data item, determining a level of confidence that a user of a mobile device is an authorized user of the mobile device to determine eligibility of the user to access the protected data item using a data protection server. The level of confidence is based on one or more of a context of the client device, an authentication history of the client device, and an access history of the user of the client device. In accordance with the level of confidence, access to the protected data item is provided to the client device using the data protection system such that a level of confidence needed to access the protected data item is based upon a sensitivity score of the protected data item.

A system for protecting a data item including a sensitivity determination module configured to determine a sensitivity score and a current protection level of the data item upon initiation of transfer of the data item from a server to a client device. A policy decision module is configured to apply a policy to determine an appropriate protection for the data item based upon the sensitivity score and the current protection level. A secure migration manager module is configured to provide a protected data item to the client device by applying the appropriate protection to the data item.

A system for protecting a data item includes a sensitivity determination module configured to determine a sensitivity score and a current protection level of the data item using a data protection server upon initiation of transfer of the data item from a server to a mobile device. A policy decision module is configured to apply a policy to determine an appropriate protection for the data item using the data protection server. The appropriate protection is based upon the sensitivity score, the current protection level, and features of at least one of the data item and the mobile device. A secure migration manager module is configured to provide a protected data item to the mobile device by applying the appropriate protection to the data item using the data protection server.

A system for accessing a protected data item includes a policy decision module configured to determine a level of confidence that a user of a client device is an authorized user of the client device to determine eligibility of the user to access the protected data item in response to a request to access the protected data item. The level of confidence is based on one or more of a context of the client device, an authentication history of the client device, and an access history of the user of the client device. An authentication manager module is configured to provide access to the protected data item to the client device in accordance with the level of confidence, such that a level of confidence needed to access the protected data item is based upon a sensitivity score of the protected data item.

A system for accessing a protected data item includes a policy decision module configured to determine a level of confidence that a user of a mobile device is an authorized user of the mobile device to determine eligibility of the user to access the protected data item using a data protection server in response to a request to access the protected data item. The level of confidence is based on one or more of a context of the client device, an authentication history of the client device, and an access history of the user of the client device. An authentication manager module is configured to provide access to the protected data item to the client device using the data protection system in accordance with the level of confidence, such that a level of confidence needed to access the protected data item is based upon a sensitivity score of the protected data item.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
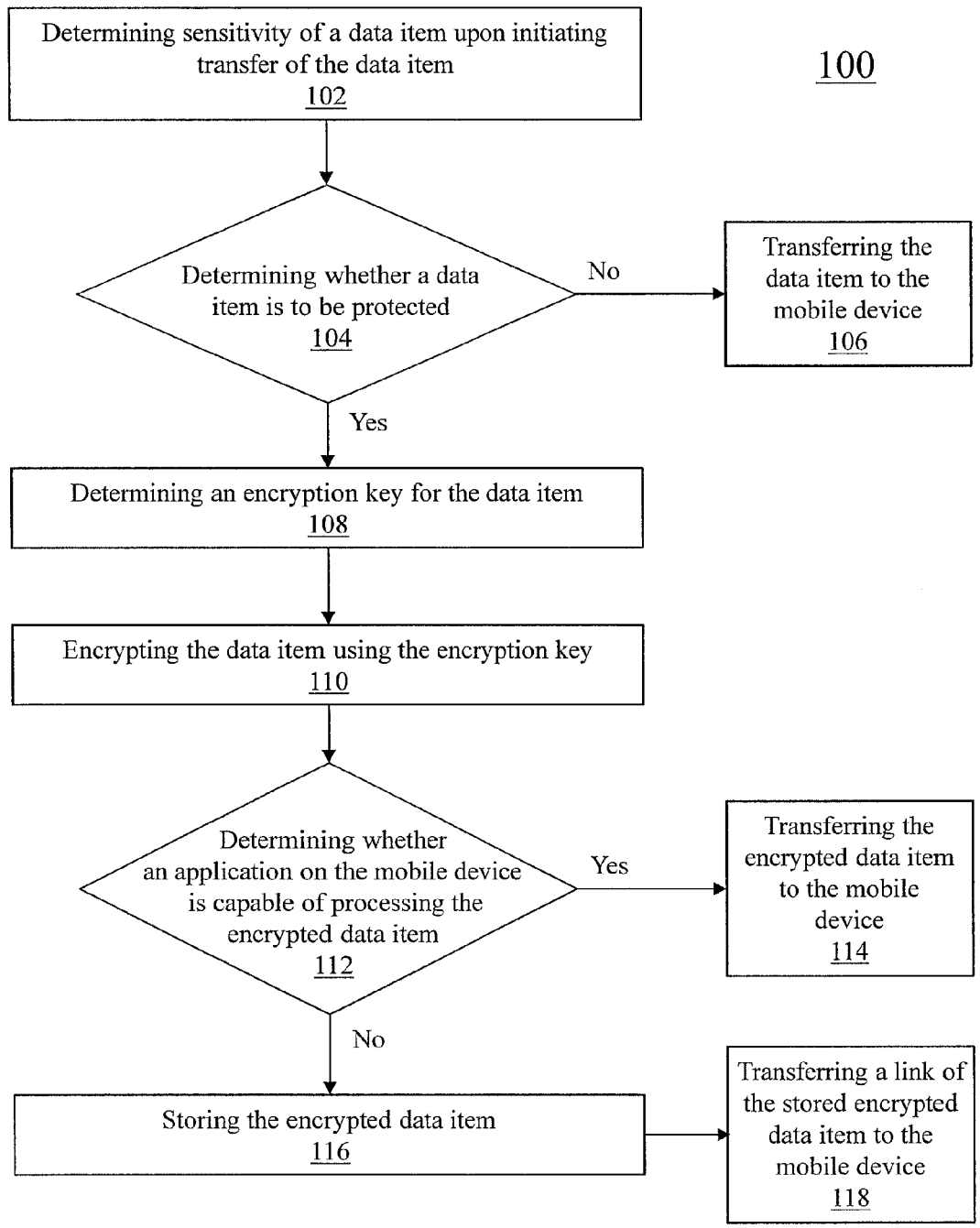
FIG. 1 is a block/flow diagram of a method for transferring a data item from a server to a mobile device, in accordance with one illustrative embodiment.

In accordance with the present principles, systems and methods for protecting sensitive data items and server and context based access control of these sensitive data items are provided. A server, such as a data protection system, may be utilized to ensure protection of the data item while also providing an opportunity to increase usability of the mobile device. For instance, the data protection system may adjust its access decisions based on the current context of the client device, the current context of the user, the level of confidence in the user's identity, etc. Preferably, the data protection system is implemented between a server and a mobile device, such as a proxy.

In one embodiment, a data item may be protected before being transferred from a server to a mobile device using the data protection system. The data protection system may determine a sensitivity (e.g., sensitivity score) and other features of the data item. Based on one or more of the sensitivity score of the data item, the features of the data item, and a policy controlling access to the data item, the data protection system may determine whether the data item needs to be protected. The sensitivity score may be based on one or more of the value of the data item to any given individual or organization, the cost of recreating the data item if destroyed or modified, and the potential losses caused directly or indirectly by the data item being made available to non-authorized individuals or organizations. Other factors in determining the sensitivity score and the need for protection of the data item are also contemplated.

In a preferred embodiment, protection includes encrypting the data item. The encrypted data item may be sent to the mobile device. In other embodiments, for example, where the mobile device is unable to process the encrypted data item, the data protection system may store the encrypted data item and send a corresponding link to the mobile device. In still other embodiments, the data item may be redacted or otherwise obfuscated. In other embodiments, the protected data item may be an aggregate protected data item including multiple versions of the data item that are protected with different methods of protection (e.g., the unmodified data item encrypted with a unique encryption key and a set of redacted versions of the data item resulting in different sensitivity scores, each encrypted with unique encryption keys). Preferably, only the protected data item is stored on the mobile device and the original version of the data item is only temporarily available in the mobile device memory.

In another embodiment, the protected data item stored on the mobile device may be accessed using the data protection system. The data protection system may evaluate whether the user of the mobile device accessing the encrypted data item is the authorized user of the mobile device. This evaluation may be based on one or more of authentication history, method of authentication, confidence in that method of authentication, risk of device loss, context of the mobile device, context of the user, etc.

In a preferred embodiment, evaluation of the user may be based on a level of confidence score that indicates how confident the data protection system is that the current interaction with the mobile device is performed by the authenticated user of the mobile device. Each authentication option (e.g., simple pass code, full password, biometrics, etc.) may be assigned a score. The accumulated authentication score of the user may be compared to a minimum authentication score to determine the eligibility of the user in the current context. Depending on the evaluation, the data protection system may decide if the user is currently eligible to access the protected data item. In one embodiment, the data protection system may require additional authentication information by sending authentication challenges to the mobile device and receiving responding authentication information.

In a preferred embodiment, the data protection system may send a decryption key to the mobile device for accessing the protected data item or for accessing a redacted version of the data item. Preferably, the decryption key is subsequently erased. If the protected data item is an aggregate protected data item including multiple versions of the data item that are protected with different methods of protection, the data protection system may send only one decryption key that only allows access to a version that is appropriate for the current device context (e.g., only allowing access to a highly redacted version of the data item in a device context that is considered insecure like an airport). It should be appreciated that the data protection system may augment the protected data item by adding new versions of the data item protected by a different method based on the current context if it is not already present in the aggregate protected data item.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present principles relate to server-based techniques for limiting the risk of loss of sensitive data on a mobile device by exercising control over the authentication needed to access the data stored on the mobile device. The present principles provide server-based protection before the transfer of a data item from a server to a mobile device, for securing the protected data item while stored on the mobile device, and for the accessing of the protected data using the mobile device.

Referring now to the drawings in which like numerals represent the same or similar elements and initially to FIG. 1, a method 100 for transferring a data item from a server to a mobile device is illustratively depicted in accordance with one illustrative embodiment. The method 100 may transfer the data item or, if appropriate, a protected version of the data item from a server to a mobile device. The server includes any computing apparatus that provides services to a client device and is not limited to any particular architecture, location or operating environment. The mobile device includes any device which obtains data from a server, such as a client computing device. The mobile device is not limited to any particular architecture, location or operating environment, and may be either stationary or mobile. For example, in one particularly useful embodiment, the mobile device may include one or more of a laptop, smartphone, tablet computer, personal digital assistant, game console, media player, camera, navigation device, and the like. It is to be understood that the present principles may be applied to any data item that can be monitored and manipulated as it is transferred between a server and a mobile device.

In block 102, upon initiating the transfer of a data item from a server to a mobile device, a sensitivity score of the data item may be determined. In one embodiment, initiating the transfer of a data item may include a request from the mobile device due to one or more of, e.g., a user request, a scheduled request, a response to an input received from one or more sensors of the mobile device, a response to an external event of another device, etc. In other embodiments, initiating the transfer of a data item may include the server sending the data item due to one or more of, e.g., a request from the mobile device, a request from another device, information received from another device, a scheduled transmission, etc. Other methods of initiating the transfer of a data item are also contemplated.

In a preferred embodiment, determining a sensitivity score of a data item includes determining sensitivity scores for a list of classes of data on a server, determining a class of the data item, and assigning the sensitivity score corresponding to the class of the data item as the sensitivity score of the data item. The sensitivity score may be based on one or more of the value of the data item to any given individual or organization, the cost of recreating the data item if destroyed or modified, and the potential losses caused directly or indirectly by the data item being made available to non-authorized individuals or organizations. Other factors in determining the sensitivity score and the need for protection of the data item are also contemplated. It is to be understood that other methods of determining a sensitivity score of a data item may be applied as is known in the art.

In another embodiment, upon initiation of transfer of a data item, features of the data item may also be determined, such as, for example, document type, author, indicators (e.g., confidentiality flags), etc. In still other embodiments, upon initiation of transfer of a data item, a current protection level of the data item may be determined, such as, e.g., whether the data item is currently already protected (e.g., encrypted or redacted), information about the mobile device (e.g., does the mobile device provide appropriate policies), etc. It should be understood that the data item may be composite; for example, the present principles may process an email as one unit or may process each portion of the email separately (e.g., subject line, body, attachments, etc.). In still other embodiments, determining a sensitivity score of the data item may further include determining a user's context, such as the user's geographic location.

In block 104, it is determined whether the data item is to be protected. Preferably, a policy is applied to determine whether the data item is to be protected. The policy may base its decision on one or more of the sensitivity score of the data item, features of the data item, metadata about the data item, etc. Other factors are also contemplated.

In block 106, if it is determined that the data item does not need protection, the data item may be transferred to the mobile device without further processing.

If it is determined that the data item does need protection, protection techniques may be applied to the data item. In a preferred embodiment, protection techniques may include encryption. However, other means of protection are also contemplated, such as, for example, redaction and other invertible and non-invertible obfuscation techniques. Other methods of protections are also contemplated. Multiple protection techniques may be applied on different copies of the data item, resulting in an aggregated protected data item that includes a set of differently protected versions of the data item. In some embodiments, protection techniques are applied to all data items.

In block 108, an encryption key for the data item is determined. It should be appreciated that while the present principles refer to an encryption key, other forms of protection may be implemented, such as a redaction function, obfuscation function, or similar instruction for protecting the data item. In a preferred embodiment, a unique encryption key is used for each application of a protection technique applied on the data item. Other encryption techniques are also contemplated. For instance, in other embodiments, encryption keys may be reused by implementing a predefined method. For example, one encryption key per data item type may be used. In another example, one encryption key for a predetermined time period may be used (e.g., one encryption key per day). In yet another example, the same encryption key may be used for all data items. The determined encryption key may be stored for future use. In block 110, an encrypted version of the data item is created using the encryption key. The encryption may be applied as is known in the art.

In another embodiment, in block 108, multiple encryption keys may be determined and applied to multiple copies of the data item to provide for an aggregate protected data item. Preferably, the aggregate protected data item includes multiple copies of the data item each protected by different protection methods. Each individually protected data item of the aggregate protected data item may be protected as appropriate to allow access according to different contexts (e.g., a heavily redacted version permissible to be viewed everywhere and a lightly redacted version that may only be viewed in locations with some level of access control). Each individually protected data item may also be assigned with an individual sensitivity score that may be lower than the sensitivity score of the data item if the data item was redacted during the application of the protection.

In block 112, it is determined whether an application on the mobile device to be used to access the data item is capable of processing data items encrypted using the encryption technique applied in block 110. An application of the mobile device may include, e.g., the mobile device as a whole, a specific program, a container, a virtual machine, etc. For example, an application capable of processing the encrypted data items may include an email program modified to implement the encryption technique. If the application used on the mobile device is capable of processing the encrypted data item, in block 114, the encrypted data item may be transferred to the mobile device.

If the application used on the mobile device is not capable of processing the encrypted data item (e.g., a standard email client), in block 116, the encrypted data item may be stored for later processing and a unique identifier may be chosen to identify the encrypted data item. In block 118, a newly created data item, which includes a link containing the unique identifier for the encrypted data item, may be sent to the mobile device instead of the original data item. In a preferred embodiment, the link may include a hyperlink that can be clicked, resulting in an automatic start of an application running on the mobile device that will allow displaying the encrypted data item. In another embodiment, the newly created data item may include a message instructing the user to open an appropriate application and an identification number to be entered to identify the stored encrypted data item. The identification number displayed in the message may be the previously chosen unique identifier or a different identification number more suitable for manual entry. In still another embodiment, the encryption key, which is known to the user (e.g., password), and the encryption method are provided by applications of the mobile device and, thus, the application may allow access to the data item without further server interaction.

Figure 2:
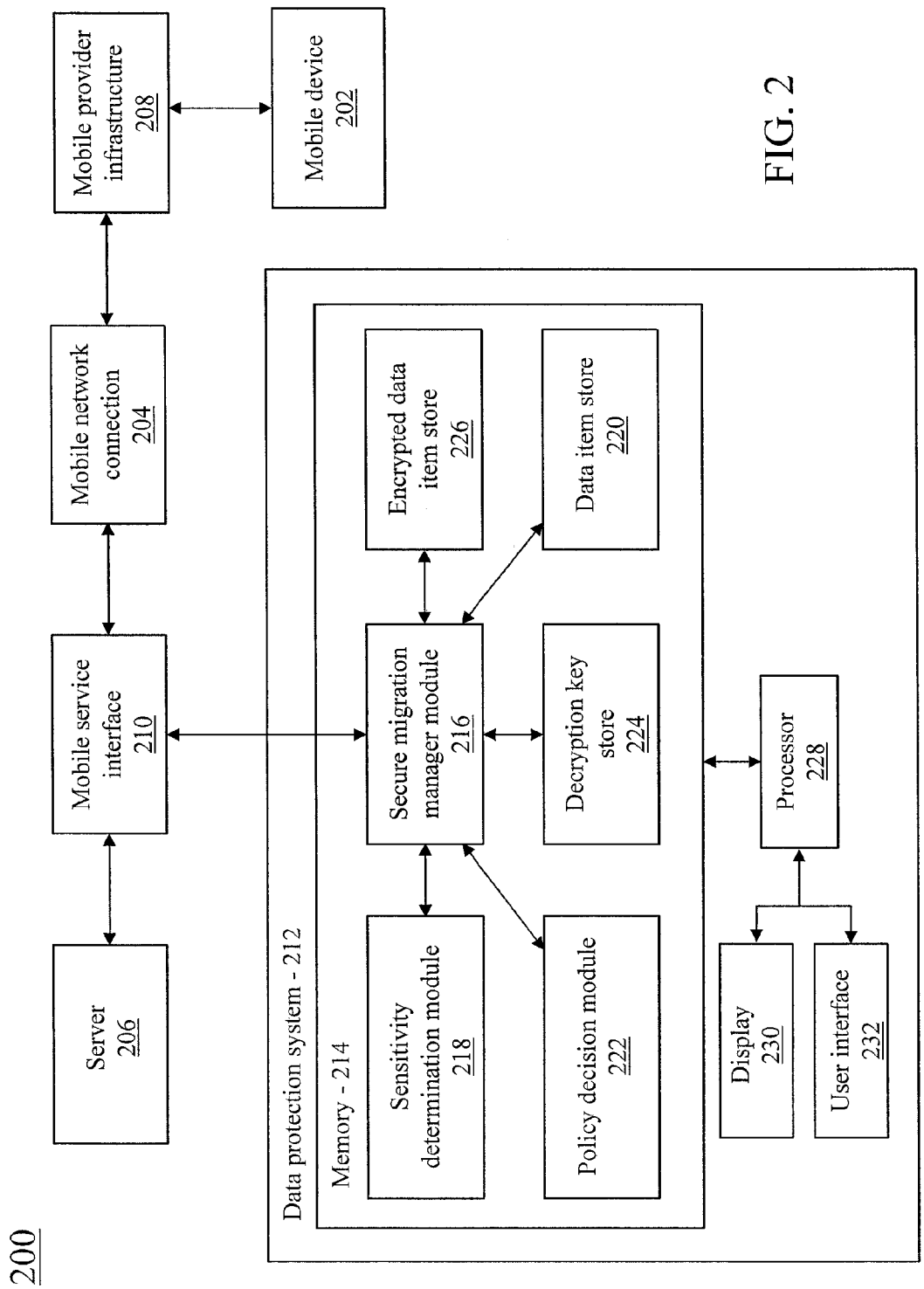
FIG. 2 is a block/flow diagram of a system for transferring a data item from a server to a mobile device, in accordance with one illustrative embodiment.

Referring now to FIG. 2, a system for transferring data items from a server to a mobile device is illustratively depicted in accordance with one embodiment. A user of a mobile device 202 may initiate the transfer of a data item stored on server 206 to the mobile device 202. The mobile device 202 includes any device which obtains data from a server, such as a client computing device. The mobile device 202 is not limited to any particular architecture, location or operating environment, and may be either stationary or mobile. For example, the mobile device 202 may include one or more of a laptop, smartphone, tablet computer, personal digital assistant, game console, media player, camera, navigation device, and the like. The server 206 is a computing apparatus that provides service to a client device, and is not limited to any architecture, location or operating environment. For instance, server 206 may include, e.g., an email server, calendar server, etc. It is noted that the present principles may be applicable to the transfer of any data item that can be monitored and manipulated between a mobile device 202 and a server 206.

In one embodiment, initiating the transfer of a data item may include a request from the mobile device 202 due to one or more of, e.g., a user request, a scheduled request, a response to an input received from one or more sensors of the mobile device 202, a response to an external event of another device, etc. In other embodiments, initiating the transfer of a data item may include the server 206 sending the data item due to one or more of, e.g., a request from the mobile device 202, a request from another device, a scheduled transmission, etc. Other methods of initiating the transfer of a data item are also contemplated.

The mobile device 202 may connect to a mobile network connector 204 to access data items and other resources stored in server 206. The mobile network connector 204 may be the interface to a network provider (e.g., mobile service provider). Connection from the mobile device 202 to the mobile network connector 204 may include authentication, encryption, etc. to secure communication and prohibit access from unauthorized devices. The mobile network connector 204 may forward communication to the server 206. Data items received from the server 206 to the mobile device 202 pass though the mobile network connector 204, which may modify the data items sent (e.g., by encrypting the data items while in transit). The connection between the mobile device 202 and the server 206 may be established using the mobile provider infrastructure 208. The connection may include various components operated by the service provider or the mobile device 202, such as, for example, mobile network antennas, Wi-Fi antennas, backbone networks, etc. Alternative architectures implementing the communication between the mobile device 202 and the server 206 have also been contemplated.

The mobile service interface 210 may modify the data items from the server 206 to translate them from one data format to another. For example, the mobile service interface 210 may modify a data item using standard protocols to allow use on a mobile device 202 using a specific protocol. In addition, the mobile service interface 210 may also modify data items transferred from the server 206 to the mobile device 202 according to the data protection system 212. The data protection system 212 may apply appropriate protections on data items transferred from the server 206 to the mobile device 202.

The data protection system 212 preferably includes one or more processors 228 and memory 214 for storing programs, applications, data, etc. The data protection system 212 may include one or more displays 230 for viewing, which may also permit a user to interact with the data protection system 212 and its components and functions. This may be further facilitated by a user interface 232, which may include a keyboard, mouse, joystick or any other peripheral or control to permit user interaction with the data protection system 212. It should be understood that the functions and components of the data protection system 212 may be integrated into one or more systems. In one embodiment, the data protection system 212 may implemented as a plug-in for an existing mobile platform infrastructure. In another embodiment, the data protection system 212 may be implemented as an additional, discrete component, such as, e.g., a proxy for the data item access protocol used to communicate between the server 206 and the mobile device 202. Other implementations of the data protection system 212 are also contemplated.

The memory 214 may store secure migration manager module 216, configured to protect data items transferred from the server 206 to the mobile device 202 to allow control of access, as appropriate. Upon initiation of transfer of a data item, sensitivity determination module 218 is configured to process the data item to determine its sensitivity score. In a preferred embodiment, determining a sensitivity score of a data item includes determining a value for different classes of data to a server 206, determining the class of the data item, and assigning the corresponding sensitivity score as the sensitivity score of the data item. Other implementations of determining the sensitivity score of a data item are also contemplated, as will be appreciated by one of ordinary skill in the art. In one embodiment, upon initiation of transfer of a data item, features of the data item may also be determined, such as, e.g., document type, author, confidentiality flags, etc. In still other embodiments, upon initiation of transfer of a data item, a current protection level of the data item may be determined, such as, e.g., whether the data item is currently already protected (e.g., encrypted or redacted), information about the client (e.g., does the client provide appropriate policies), etc. It is noted that the data items may be composite. For example, the data item may include an email to be processed as one unit or to be processed in portions (e.g., subject line, body, attachments, etc.). The information returned by sensitivity determination module may be stored in data item store 220 for future access.

The policy decision module 222 applies a policy controlling access to the data item to determine whether the data item is to be protected (e.g., encrypted). The policy may base its determination on one or more of the following: sensitivity score of the data item determined by sensitivity determination module 218, data item content, metadata of the data item, information about the mobile device 202, the capabilities of the mobile device 202, etc.

If the policy decision module 222 determines that the data item does not need to be protected, the data item may be transferred to the mobile device 202 without any further processing. If the policy decision module 222 determines that the data item does need protection, appropriate protections are applied on the data items. In a preferred embodiment, protecting data items includes encrypting the data items. However, it is noted that other implementations of protecting data items are also contemplated. For example, applying appropriate protections on data items may include redaction, password access, etc.

The secure mobile migration manger module 216 may then encrypt the data item by determining an encryption key. It should be appreciated that the present principles are not limited to determining an encryption key, but may be implemented using other forms of protection, such as a redaction function, obfuscation function, or similar instruction. Preferably, a unique encryption key is used for each data item. Other encryption techniques are also contemplated. In some embodiments, encryption keys may be reused according to a predefined arrangement. For example, encryption keys may be assigned by data item type, by time period, or the same encryption key may be used for all data items. The encryption key may be stored at decryption key store 224 for future use. The secure migration manager module 216 may encrypt the data item using the encryption key. In one embodiment, the decryption key may be encrypted with a public key unique to the mobile device 202.

In another embodiment, secure migration module 216 may determine and apply multiple encryption keys to multiple copies of the data item to provide an aggregate protected data item. Preferably, the aggregate protected data item includes multiple copies of the data item each protected by different protection methods. Each individually protected data item of the aggregate protected data item may be protected as appropriate to allow access according to different contexts (e.g., a heavily redacted version permissible to be viewed everywhere and a lightly redacted version that may only be viewed in locations with some level of access control). Each individually protected data item may also be assigned with an individual sensitivity score that may be lower than the sensitivity score of the data item if the data item was redacted during the application of the protection.

If the accessing application of the mobile device 202 is capable of processing the encrypted data item, the encrypted data item may be transferred to the mobile device 202. The accessing application may include, e.g., the mobile device 202 as a whole, a specific program, a container, a virtual machine, etc. If the accessing application of the mobile device 202 is not capable of processing the encrypted data item, the encrypted data item may be stored in the encrypted data item store 226. Each stored encrypted data item may be assigned a unique identifier to identify the encrypted data item. The unique identifier may also be used to retrieve the appropriate decryption key from decryption key store 224. In one embodiment, a newly created data item may be sent to the mobile device 202 including a link to the encrypted data item. Preferably, the link includes a hyperlink that can be clicked to automatically start an application on the mobile device that will display the encrypted data item. In other embodiments, the newly created data item may include a message with an ID. The message may instruct the user to open an appropriate application on the mobile device 202 and enter an identification number. The identification number may include the unique identifier or a different identifier more suitable for manual entry. In still other embodiments, the encryption key is known to the user and the encryption is provided by an application on the mobile device 202 to allow access to the encrypted data item without further server interaction.

Figure 3:
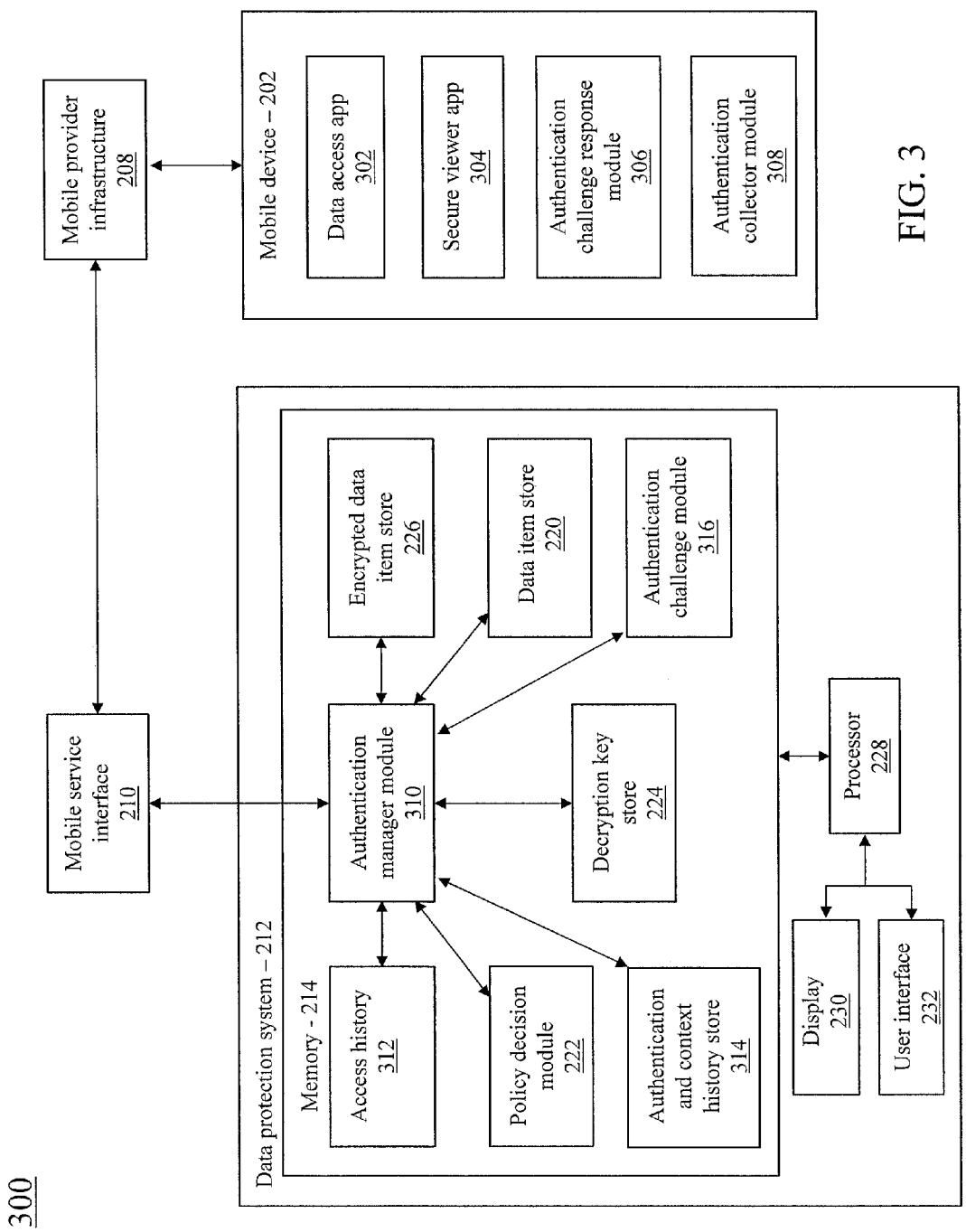
FIG. 3 is a block/flow diagram of a system for controlling access to a data item stored on a mobile device, in accordance with one illustrative embodiment.

Referring now to FIG. 3, a system 300 for controlling access to a data item stored on a mobile device is illustratively depicted in accordance with one embodiment. Access to the encrypted data item may be initiated by the mobile device 202. Preferably, access to the encrypted data item may be initiated by the data access app 302 of the mobile device 202. In one embodiment, the data access app 302 is configured to access the encrypted data item directly. In another embodiment, for example, where the data access app 302 is unable to process the encrypted data item, the secure viewer app 304 is configured to access the encrypted data item. In a preferred embodiment, the secure viewer app 304 is started by activating a link displayed in the data access app 302. The data access app 302 may also provide information to the secure viewer app 304 regarding the encrypted data item to be accessed. In other embodiments, the data access app 302 displays an identifier that the user may enter in the secure viewer app 304 to identify the stored encrypted data item.

Upon initiating access to the encrypted data item, the application initiating the access (i.e., data access app 302 or secure view app 304) may determine whether the encrypted data item is stored on the mobile device 202. For example, the encrypted data item may already be stored on the mobile device 202 if the user had previously viewed the encrypted data item or if the encrypted data item was transferred by a background process (e.g., data sync). If the encrypted data item is not currently stored on the device, the application initiating access (i.e., data access app 302 or secure viewer app 304) requests transfer from the authentication manager module 310 of the data protection system 212. The encrypted data item store 226 may provide the encrypted data item to the mobile device 202 where the encrypted data item was not already transferred to the mobile device 202, such as when a link was sent to the mobile device 202 instead of the encrypted data item.

Once the encrypted dated item is available on the mobile device 202, the application initiating the access (i.e., data access app 302 or secure view app 304) may request the decryption key from the authentication manager module 310, which is stored in decryption key store 224 of the data protection system 212. In one embodiment, the request is sent using the mobile provider infrastructure 208 and mobile service interface 210. In another embodiment, the request may be sent directly to the authentication manager module 310.

The authentication manager module 310 processes the request for the decryption key by using the policy decision module 222 to determine whether a user is currently eligible to access the encrypted data item. Based on the determination of the policy decision module 222, the appropriate decryption key may be sent to the mobile device 202. If the request for the decryption key includes authentication or context information, the authentication and context history store 314 may be first updated. In one embodiment, content access requests and authentication information may also be forwarded to a security information manager to provide auditing, alerts, and other automated or human reactions to the information.

The policy decision module 222 may determine whether a user is eligible to view the encrypted data item based on the level of confidence that the authorized and authenticated user of the mobile device 202 is the current user of the mobile device 202. In a particularly useful embodiment, the level of confidence may be represented as an accumulated authentication score. Each authentication option (e.g., simple pass code, full password, biometrics, etc.) may be assigned a score and, based on the authentication information provided by the mobile device, the accumulated authentication score may be compared to a minimum score for access to the encrypted data item. The level of confidence may also be decreased with the amount of sensitive information access on the mobile device. In one embodiment, a fixed authentication score may be assigned to each authentication option. In other embodiments, the authentication score for each authentication option provided by the mobile device may be modified based on one or more of a context of the client device at a time of authentication, contexts of the client device since authentication, and an amount of time passed since authentication. For example, in one embodiment, a range of scores may be assigned to each authentication option provided by the mobile device, such that a particular authentication score is selected within the range based, e.g., on the confidence of the authentication option. Other representations of the level of confidence are also contemplated.

In one embodiment, the level of confidence may be determined based on the time of last successful authentication of the user through the mobile device 202 or the method of authentication, such as password or biometric authentication. In another embodiment, the level of confidence may be determined based on the confidence of the authentication method (e.g., the confidence of a fingerprint identification, voice recognition or facial recognition), the trust in the authentication method itself (e.g., based on the difficultly to achieve a false positive authentication by exploiting weaknesses in the authentication method), or the sensitivity score of the data item. In still a further embodiment, the level of confidence may be determined based on the history of data access (e.g., based on volume, topic, average sensitivity, etc.) or the current context of the device (e.g., current location, nearby devices, etc.). For instance, the history may be used to determine if the data accessed or current context of the mobile device 202 is unusual. The access history 312 may be used to determine which encrypted data items were accessed in the past from the mobile device 202. The authentication and context history store 314 may be used to determine the most recent context for the mobile device 202.

In still other embodiments, the level of confidence may be based on a current context, such as a context of the mobile device 202 or the context of the user. The context of the mobile device 202 may include one or more of the following: the current location of the mobile device 202, the history of previous locations of the mobile device 202, the history of previous compromises of the mobile device 202, the ownership status of the mobile device 202 (e.g., corporate owned or personally owned), the operating system of the mobile device 202, the applications installed on the mobile device 202, the current patch level of the mobile device 202, the presence of known or suspected malware on the device, and the security status of the networks which the device is connected to. Other factors related to the context of the mobile device 202 are also contemplated. The context of the user may include one or more of the following: the management status of the user, the business role of the user, the history of the user's access to data of known sensitivity, the aggregated sensitivity score of all data items accessed by the user, the history of the user in experiencing the loss or theft of devices, and the history of the individual in accessing the device. Other factors for the context of the user are also contemplated.

In yet another embodiment, the level of confidence may be determined based on the risk of device loss or unauthorized device access in the current or recent context of the device (e.g., the probability of theft of the device at the current location or at a previously visited location). In a preferred embodiment, the policy decision module 222 may include a risk engine to determine the risk of loss of mobile device 202 or the risk of unauthorized access to mobile device 202. In an embodiment, the risk may be based on one or more of the likelihood that the data item may be leaked or misused, the potential damage of such leakage or misuse, etc. The likelihood may be based on one or more of the sensitivity score of the data item, the type of the data item, the access history 312, the deviation of the most recent access patterns from the access history 312 from a longer-term access patterns in the access history 312, and the current context of the mobile device 202. The potential damage may be based on one or more of the sensitivity score of the requested data item, the aggregated sensitivity scores of the data items the user has accessed in the past, and the aggregated sensitivity scores of data items that are currently stored on the mobile device 202. In still another embodiment, the risk that the mobile device 202 may be lost or mishandled may be based on, e.g., the user's history of losing or mishandling the mobile device 202. Other risk factors are also contemplated.

Based on the level of confidence, the policy decision module 222 may determine whether access to the encrypted data item is allowed. If access is allowed, the authentication manager module 310 retrieves the decryption key from decryption key store 224 and sends it to the mobile device 202. If access is not allowed, additional authentication information may be needed. The authentication manager module 310 may provide a list to the mobile device 202 including authentication options, a score for each authentication option which indicates the level of confidence, and a minimum score to allow access to the encrypted data item.

Unused authentication information may be sent from the mobile device 202 to the authentication and context history store 314. For example, the authentication collector module 308 of the mobile device 202 may provide authentication information by performing continuous authentication in the background. The continuously collected authentication information may include biometrics (e.g., voice recordings, pictures), usage patterns that indicate the current user is the authorized user, etc. Other forms of continuously collected authentication information are also contemplated. In another example, authentication information may be provided by the authentication challenge response module 306 on the mobile device 202 responding to a challenge from the authentication challenge module 316. The policy decision module 222 determines whether access is allowed based on the level of confidence from the updated authentication information.

If no additional, unused authentication information is available, authentication challenges may be created by the authentication challenge module 316 based on the list of available authentication options. Preferably, a set of one or more of the least intrusive authentication options is selected that fulfill the minimum authentication score needed for access to the encrypted data item. A first authentication challenge may be sent from the authentication challenge module 316 to the mobile device 202. In some embodiments, the authentication challenge module 316 may be configured such that intercepted responses to challenges may not be reused at a later time to gain unauthorized access to the encrypted data item. In one embodiment, the authentication challenge module 316 may send the challenges without the mobile device 202 requesting a decryption key for an encrypted data item. The challenge may be responded to by authentication challenge response module 306 and/or authentication collector 308 on the mobile device 202.

In one embodiment, the authentication challenges may involve user interaction, such as, e.g., entering a password/PIN, responding to biometric challenges such as taking a picture or voice recordings, etc. In another embodiment, the challenges may include non-interactive response, such as, e.g., reporting the current location based on global positioning system (GPS) coordinates, responding to a signal receivable only in certain locations to verify that the device is within the limited signal range, etc. In another example, the authentication challenge may include contacting a third party (e.g., a verification call to a call center) to respond the challenge. The response may be submitted by the user on the mobile device 202 to the authentication manager module 310 or may be submitted directly by the third party to the authentication and context history store 314. Other challenges are also contemplated within the scope of the present principles. In some embodiments, the authentication challenge response module 306 may be integrated into the app used to access the encrypted data item (i.e., data access app 302 or secure viewer app 304).

The first additional authentication information response may be added to the current authentication information of the user and it is determined whether the updated authentication information of the user satisfies the authentication manager module 310. Preferably, the accumulated authentication score of the authentication information of the user is compared to the minimum authentication score for access. If it is determined that the updated authentication information is still not sufficient, a second authentication challenge option may be selected and the process is repeated until access is allowed or no other authentication options are available.

If the policy decision module 222 allows access, the appropriate decryption key may be transferred from the decryption key store 224 to the mobile device 202. If the policy decision module 222 denies access, the authentication manager module 310 may send a message to the mobile device 202 indicting that access is denied until the context (e.g., location) changes.

In one embodiment, the policy decision module 222 may determine that a redacted version of the data item should be displayed based on the level of confidence in the user's identity and the current context of the mobile device (e.g., in a public location with a high risk of unauthorized access by "shoulder surfing," where a third-party observes the mobile device 202 screen while the authorized user is viewing the data item). In one embodiment, redaction may be implemented in an aggregate protected data item, including several versions of the encrypted data item at various levels of redaction and each with different decryption keys. The policy decision module 222 may determine an appropriate decryption key according to, e.g., the current level of confidence of the user's identity and the current context of the mobile device. The data protection system 212 may also send multiple decryption keys for all redacted versions of the data items that are permissible to be accessed given the current level of confidence of the user's identity and the current context of the mobile device to allow the mobile device 202 to select one of them. It should be appreciated that the data protection system 212 may augment the protected data item by adding new versions of the data item protected by a different method of protection based on the current level of confidence of the user's identity and the current context if an appropriate redaction it is not already present in the aggregate protected data item.

In still other embodiments, the policy decision module 222 may send the decryption key to the mobile device 202 with a (e.g., warning) message. The message may be displayed to the user before displaying the data item to inform the user to take proper precautions (e.g., "Please make sure nobody can see your screen while viewing this data"). The warning message may also mandate a confirmation by the user to acknowledge that proper precaution is taken to protect the data item (e.g., "Please confirm that nobody will be able to view this data while it is displayed. Your confirmation will be added to the audit logs for the data."). User responses to a confirmation may be stored in the access history 312 for later auditing.

Once the encrypted data item is decrypted, the decryption key may be securely deleted from the mobile device 202. When the decrypted data item is closed, the decrypted data item may be securely deleted from the mobile device 202. For example, the decrypted data item may be closed by switching applications on the mobile device 202, locking the mobile device 202, activating a timeout screensaver, etc. Other implementations of closing the decrypted data item are also contemplated.

Figure 4:
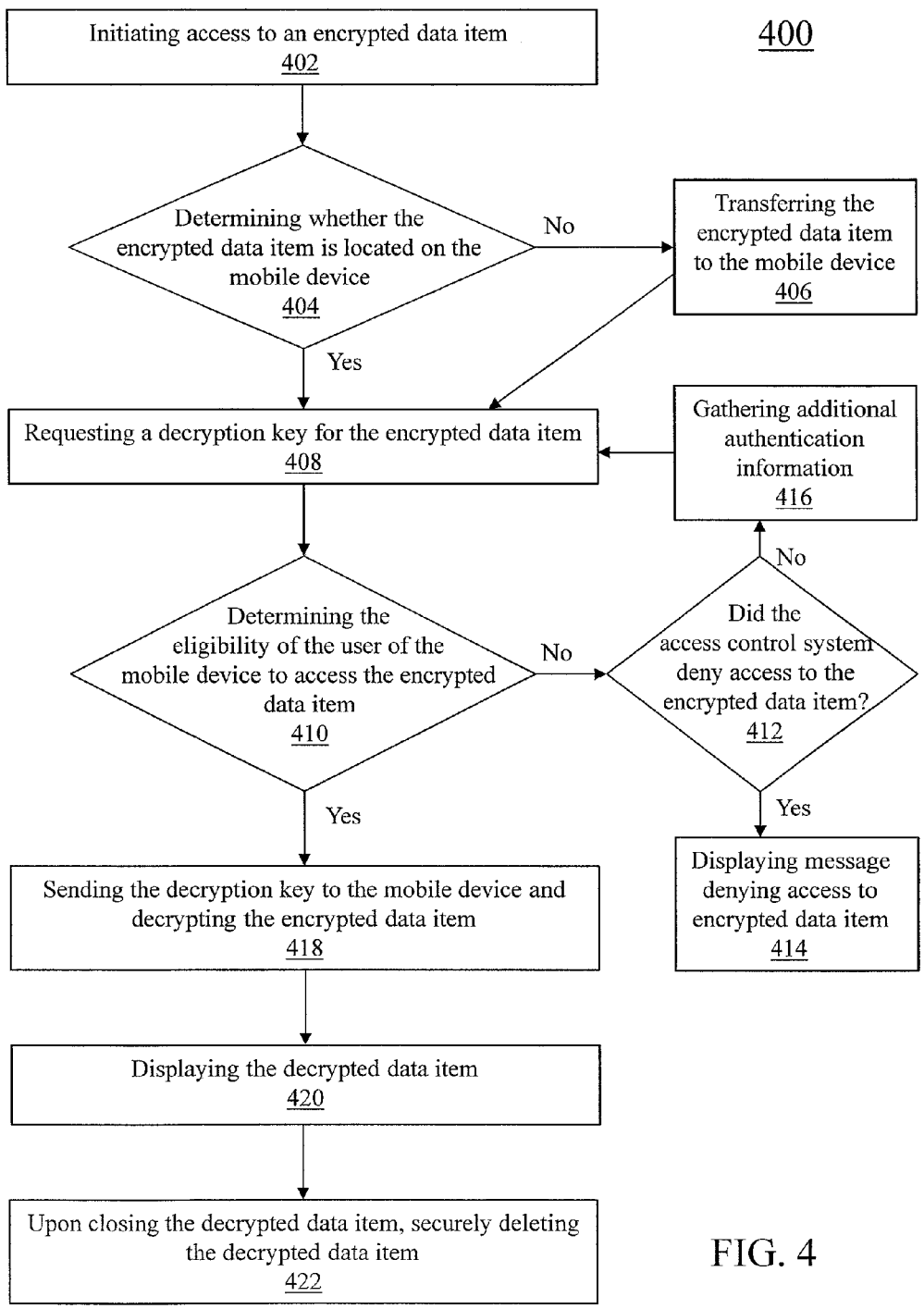
FIG. 4 is a block/flow diagram of a method for controlling access to a data item stored on a mobile device, in accordance with one illustrative embodiment.

Referring now to FIG. 4, a method 400 for controlling access to a data item stored on a mobile device is illustratively depicted in accordance with one embodiment. In block 402, the mobile device may initiate access to an encrypted data item. Preferably, access to the encrypted data item may be initiated by a data access app stored on the mobile device. The data access app may access the encrypted data item directly. In another embodiment, such as where the data access app in unable to process the encrypted data item, a secure viewer app may access the encrypted data item. In a preferred embodiment, the secure viewer app may be started by clicking on a link.

In block 404, it is determined whether the encrypted data item is already on the mobile device. For example, the encrypted data item may already be on the device if the user has previously viewed the data item or if the transfer of the data item is performed by a background process (e.g., a data sync). If the data item is not already on the mobile device, in block 406, the data item may be requested from the data protection system and transferred to the mobile device. Once the encrypted data item is available on the mobile device, in block 408, a decryption key for the encrypted data item may be requested from the data protection system (e.g., from authentication manager module 310 of FIG. 3).

In block 410, it is determined whether a user is currently eligible to access the encrypted data item. In a preferred embodiment, user eligibility may be based on a minimum authentication score. Each authentication option may be given a score, with the accumulated authentication score of the user reflecting the level of confidence that the data protection system has in the user's identity. The accumulated authentication score may be compared with the minimum authentication score to determine whether a user is eligible to access the encrypted data item. In one embodiment, determining eligibility of a user may be performed as discussed with respect to FIG. 6. Other methods of determining user eligibility are also contemplated.

If the user was found to be eligible, a decryption key may be sent to the mobile device. If the user was not found to be eligible, in block 412, it is determined whether the data protection system denied access to the encrypted data item or needs additional authentication. If the server denied access to the encrypted data item, in block 414, a message may be displayed. For instance, the message may indicate that displaying the data item is not possible in the current context and can be retried in a different context (e.g., different location). If the server did not deny displaying the encrypted data item, but instead needs additional authentication, in block 416, additional authentication is gathered. In one embodiment, additional authentication information is gathered as discussed with respect to FIG. 5. Once additional authentication information is gathered, the mobile device may again request the decryption key for the encrypted data item with using the updated authentication information (e.g., the updated accumulated authentication score of the user), in block 408.

In block 418, a decryption key may be sent to the mobile device to decrypt the encrypted data item. In one embodiment, the decryption key may be sent to the mobile device according to a level of redaction of the data item. For example, a redacted version may be displayed based on a level of confidence in the user's identity and the current context. Preferably, redaction may be implemented by storing several versions of the encrypted data items at various levels of redaction and each with different decryption keys. An appropriate decryption key may be sent according to the level of redaction.

In another embodiment, a decryption key may be sent with a warning message. For example, the warning message may be displayed before the data item is displayed, informing the user to take proper precautions to, e.g., avoid unauthorized access to the data through "shoulder surfing." The warning message may include an acknowledgement, such that the user must confirm that proper precaution is taken to protect the data item. The user's response may be stored for later auditing.

Preferably, after decryption, the decryption key is securely deleted from the mobile device. In block 420, the decrypted data item may be displayed on the mobile device. In block 422, once the decrypted data item is closed, the decrypted data item may be securely deleted from the mobile device. For example, the decrypted data item may be closed due to switching applications, locking the device, timeout activating screen saver, etc. The decrypted data item may be immediately deleted or deleted at some future time. If the application is re-activated at some later point in time, the method restarts at block 402.

Figure 5:
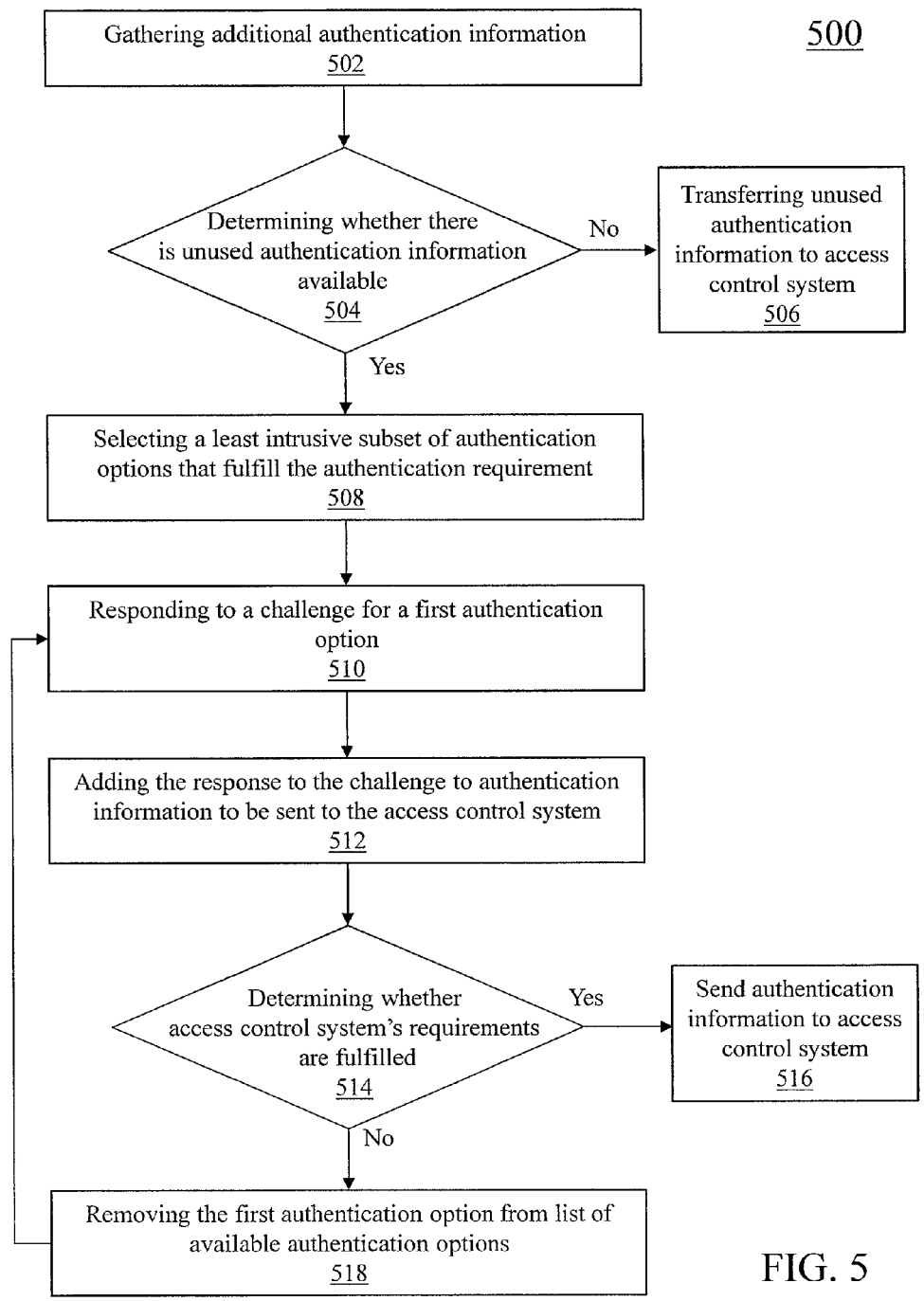
FIG. 5 is a block/flow diagram of a method for gathering additional authentication information from a mobile device, in accordance with one illustrative embodiment.

Referring now to FIG. 5, a method 500 for gathering additional authentication information from a mobile device is illustratively depicted according to one embodiment. In block 502, the data protection system may request additional authentication information, as in block 416 of FIG. 4. Preferably, the data protection system may provide a list to the mobile device including authentication options, an authentication score for each authentication option indicating the level of confidence for that option, and a minimum authentication score needed to access the encrypted data item. In block 504, it is determined if additional, previously unused authentication information is available. If unused authentication information is available, in block 506, the authentication information may be updated with the unused authentication information and sent to the data protection system. In one embodiment, the mobile device may provide unused authentication information by continuously collecting authentication information. For example, continuously collected authentication information may include biometrics, usage patterns, etc. In another embodiment, unused authentication information may be provided by the mobile device by responding to challenges from the data protection system. If the unused authentication information is not sufficient, the process restarts at block 502.

If there is no additional unused authentication information available, additional authentication challenges may be sent to the mobile device to gather additional authentication information. In an embodiment, the authentication challenges may be sent without the mobile device requesting a decryption key (e.g., randomly).

In one embodiment, the authentication challenges may involve user interaction. For example, the challenge may require a user to enter a password/PIN, respond to biometric challenges such as taking a picture or voice recordings, etc. In another embodiment, the authentication challenges may include non-interactive response. For example, the authentication challenges may request a report of the current location based on global positioning system (GPS) coordinates, respond to a signal receivable only in certain locations to verify that the device is within the limited signal range, etc. In another example, the authentication challenge may include contacting a third party (e.g., a verification call to a call center) to respond the challenge. The authentication challenge response may be submitted by the user of the mobile device to the data protection system or may be submitted directly by the third party to the data protection system. Other challenges are also contemplated.

In block 508, a least intrusive subset of authentication challenges may be selected that fulfill the data protection system's requirement for access. In a preferred embodiment, the data protection system's requirement for access includes the minimum score. In block 510, the mobile device responds to the first authentication challenge. The response may include interactive and non-interactive responses to the authentication challenges. In block 512, the response to the first authentication challenge may be added to the authentication information of the user. In block 514, it is determine whether the authentication requirements are fulfilled by the updated set of current authentication information. Preferably, the authentication scores of the first authentication challenge is added to the accumulated authentication score of the user and compared to the minimum score needed for access to the encrypted data item. The minimum authentication score may be received by the mobile device as part of the request for additional authentication information in block 502. In another embodiment, after gathering one user authentication response, the updated user authentication information is sent to the data protection system. If the authentication challenge response is still not sufficient, the process is repeated at block 502.

If the user authentication information satisfies the authentication requirements, in block 516, the user authentication information may be sent to the data protection system. If the authentication requirements are not satisfied by the user authentication information, in block 518, the authentication option used is removed from the list of available authentication options and the process returns to block 510 for another authentication challenge option on the list.

Figure 6:
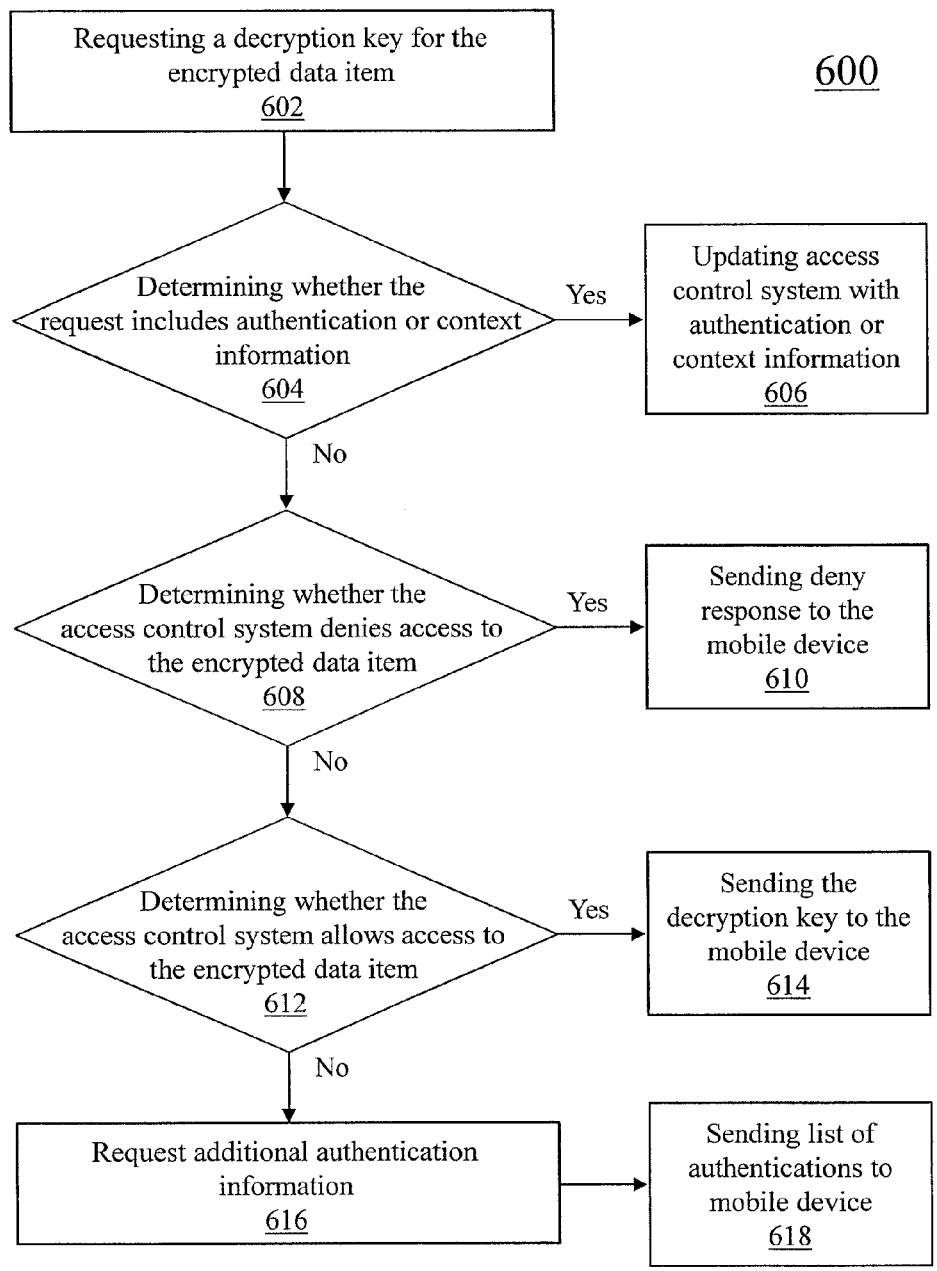
FIG. 6 is a block/flow diagram of a method for determining user eligibility for accessing an encrypted data item on a mobile device, in accordance with one embodiment.

Referring now to FIG. 6, a method for determining user eligibility for accessing an encrypted data item on a mobile device is illustratively depicted in accordance with one embodiment. In a preferred embodiment, access to an encrypted data item may be based on an authentication score. Each authentication option may be assigned a score. The score may be fixed for each authentication option or may be a range of scores for an authentication option, wherein the score is selected within the range based on, e.g., the confidence of the authentication option (e.g., the confidence in a voice recognition authentication option). This allows for assigning a trust in the authentication method itself and an adjustment for the authentication action. Other factors to select the authentication score within the range are also contemplated. An accumulated authentication score based on the user's authentication information may be compared to a minimum required authentication score to determine access to the encrypted data item. Other methods of determining user eligibility are also contemplated.

In block 602, the data protection system receives a request from a mobile device for a decryption key for an encrypted data item. In block 604, it is determined whether the request includes updated authentication or context information, such as updated location information. If the request does include authentication or context information, in block 606, the data protection system may be updated. In one embodiment, the access request and authentication information may be forwarded to a security information manager system to allow audits, alerting and other automated or human reactions to the content access and authentication information.

The data protection system may collect all pertinent information relating to the data item (e.g., metadata, access history for the mobile device, authentication and context history, security information, etc.). Based on the collected information, in block 608, it is determined whether a user is eligible to access to the encrypted data item based on the policy controlling access to the data item. The policy may base its decision on a level of confidence that the authorized user of the mobile device is the current user of the mobile device.

In one embodiment, the level of confidence may be determined based on the time of last successful authentication of the user through the mobile device or the method of authentication, such as password or biometric authentication. In another embodiment, the level of confidence may be determined based on the confidence of the authentication method (e.g., the confidence of a fingerprint identification, voice recognition or facial recognition), the trust in the authentication method itself (e.g., based on the difficultly to achieve a false positive authentication by exploiting weaknesses in the authentication method), or the sensitivity score of the data item. In still a further embodiment, the level of confidence may be determined based on the history of data access (e.g., based on volume, topic, average sensitivity scores, etc.) or the current context of the device (e.g., current location, nearby devices, etc.). For instance, the history may be used to determine if the data accessed or current context of the mobile device is unusual. The access history may be used to determine which encrypted data items were accessed in the past from the mobile device. The authentication and context history store may be used to determine the most recent context for the mobile device.

In still other embodiments, the level of confidence may be based on a current context of, e.g., the mobile device or the user of the mobile device. The context of the mobile device may include one or more of the following: the current location of the mobile device, the history of previous locations of the mobile device, the history of previous compromises of the mobile device, the ownership status of the mobile device (e.g., corporate owned or personally owned), the operating system of the mobile device, the applications installed on the mobile device, the current patch level of the mobile device, the presence of known or suspected malware on the device, and the security status of the networks which the device is connected to. Other factors related to the context of the mobile device are also contemplated. The context of the user may include one or more of the following: the management status of the user, the business role of the user, the history of the user's access to data of known sensitivity, the history of the user in experiencing the loss or theft of devices, and the history of the individual in accessing the device. Other factors for the context of the user are also contemplated.

In yet another embodiment, the level of confidence may be determined based on the risk of device loss or unauthorized device access in the current or recent context of the device (e.g., the probability of theft of the device at the current location or at a previously visited location). In an embodiment, the risk may be based on one or more of the likelihood that the data item may be leaked or misused, the potential damage of such leakage or misuse, etc. The likelihood may be based on one or more of the level of confidence and the current context of the mobile device. The potential damage may be based on one or more of the sensitivity score of the requested data item, the aggregated sensitivity score of the data items the user has accessed in the past, and the aggregated sensitivity score of data items that are currently stored on the mobile device. Those skilled in the art will appreciate that various methods can be used to create an aggregated sensitivity score. Some examples for aggregation include adding all scores, taking the maximum of the scores, or using monotone functions to map the individual scores into an aggregated score. Other methods of aggregating the individual scores are also contemplated. In still another embodiment, the risk that the mobile device may be lost or mishandled may be based on, e.g., the user's history of losing or mishandling the mobile device. Other risk factors are also contemplated.

If access to the encrypted data item is denied, in block 610, a response may be sent to the mobile device indicating that access to the encrypted data item is denied until the context changes. If access is not denied, in block 612, it is determined whether the level of confidence in the user's identity is sufficient to display the data item. For example, in one embodiment, the accumulated authentication score of the user is compared to a minimally required authentication score to determine access to the encrypted data item. If trust is sufficient to display the data item, in block 614, the decryption key is sent to the mobile device.

If the level of confidence in the user's identity is not sufficient to access the data item, in block 616, then additional authentication information may be needed. The data protection system may request additional authentication information from the mobile device. In one embodiment, additional authentication information is gathered as discussed with respect to FIG. 5. A list of authentications that will sufficiently increase the level of confidence in the user's identity to allow access to the encrypted data item may be created. In one embodiment, the list of authentications is created by creating a powerset of all available authentication options. Each authentication option may be iteratively added to the current authentication information of the user such that, if the data protection system allows access to the encrypted data item based on the authentication information of the user including the selected authentication option, that selected authentication option may be added to a list of possible authentication options sufficient for accessing the encrypted data item. In one embodiment, the list of authentication methods may include third party identity verification of the user's identity. In block 618, the list of authentication options may be sent to the mobile device.

Having described preferred embodiments of a system and method to provide server control for access to mobile client data (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for protecting a data item, comprising:
a hardware processor;
a sensitivity determination module configured to determine a sensitivity score of the data item and a current protection level of the data item upon initiation of transfer of the data item from a server to a client device;
a policy decision module configured to apply a policy, using the processor, to determine an appropriate protection for the data item based upon the sensitivity score, the current protection level, and features of the client device, wherein the features of the client device include one or more of a history of compromises, an ownership status, an operating system, a version of the operating system, applications stored on the client device, a patch status, suspected malware, a status of a network connected to the client device, and an application of the client device used to access the data item; and a secure migration manager module configured to provide a protected data item to the client device by applying the appropriate protection to one or more data items, wherein a unique encryption key is employed for each application of a protection technique on each of the one or more data items.

2. The system as recited in claim 1, wherein sensitivity determination module is further configured to:
   determine sensitivity scores for classes of data on the server;
   determine a class of the data item from the classes of data on the server; and
   assign a sensitivity score corresponding to the class of the data item as the sensitivity score of the data item.

3. The system as recited in claim 1, wherein the policy decision module is further configured to determine the appropriate protection based upon one or more of features of the data item.

4. The system as recited in claim 3, wherein features of the data item include one or more of type, creator, and indicator of the data item.

5. The system as recited in claim 1, wherein the secure migration manager module is further configured to provide a link referring to the protected data item.

6. The system as recited in claim 1, wherein the initiation of transfer includes at least one of a request from the client device and a server initiated transfer of the data item.

7. The system as recited in claim 6, wherein the request from the client device is due to at least one of a user request, a scheduled request, a signal received by a sensor of the client device, and an event external from the client device.

8. The system as recited in claim 6, wherein the server initiated transfer is due to at least one of a request from the client device, a request from a second device, receiving data from the second device, and a scheduled transfer.

9. The system as recited in claim 1, wherein the secure migration manager module is further configured to apply at least one of encryption, redaction, invertible obfuscation, and non-invertible obfuscation.

10. The system as recited in claim 1, wherein the protected data item includes more than one copy of the data item, wherein at least two of the more than one copy of the data item are protected by different methods of protection.

11. The system as recited in claim 1, wherein the client device is a mobile device.

12. The system as recited in claim 1, further comprising a data protection server including the sensitivity determination module, the policy decision module, and the secure migration manager module.

13. A system for protecting a data item, comprising:
   a hardware processor;
   a sensitivity determination module configured to determine a sensitivity score of the data item and a current protection level of the data item using a data protection server upon initiation of transfer of the data item from a server to a mobile device;
   a policy decision module configured to apply a policy, using the processor, to determine an appropriate protection for the data item using the data protection server, wherein the appropriate protection is based upon the sensitivity score, the current protection level, features of at least one of the data item and the mobile device, wherein the features of the mobile device include one or more of a history of compromises, an ownership status, an operating system, a version of the operating system, applications stored on the client device, a patch status, suspected malware, a status of a network connected to the client device, and an application of the client device used to access the data item; and
   a secure migration manager module configured to provide one or more protected data items to the mobile device by applying the appropriate protection to the one or more data items using the data protection server, wherein a unique encryption key is employed for each application of a protection technique on each of the one or more data items.

14. A system for accessing one or more protected data items, comprising:
   a hardware processor;
   a policy decision module configured to determine, using the processor, a level of confidence that a user of a client device is an authorized user of the client device to determine eligibility of the user to access the one or more protected data items in response to a request to access the one or more protected data items, wherein the level of confidence is based on one or more of a context of the client device, an authentication history of the client device, and an access history of the user of the client device, wherein the context of the client device includes one or more of a current location, a location history, a history of compromises, an ownership status, an operating system, a version of the operating system, an application stored on the client device, a patch status, suspected malware, and a security status of a network connected to the client device; and
   an authentication manager module configured to provide access to the one or more protected data items to the client device in accordance with the level of confidence, such that a level of confidence needed to access the protected data item is based upon a sensitivity score of the one or more protected data items, wherein a unique encryption key is employed for each application of a protection technique on each of the one or more protected data items.

15. The system as recited in claim 14, wherein the level of confidence is based on a context of the user, wherein the context of the user includes one or more of a management status, a business role, an access history to sensitive data items, a history of device loss, and an access history of the user.

16. The system as recited in claim 14, wherein the policy decision module is further configured to:
   assign a score to each authentication option;
   determine an accumulated score by accumulating scores for each authentication option provided by the client device; and
   compare the accumulated score with a minimum score needed to access the protected data item.

17. The system as recited in claim 16, wherein the policy decision module is further configured to modify the score for one or more authentication options provided by the client device based on one or more of a context of the client device at a time of authentication, contexts of the client device since authentication, and an amount of time passed since authentication.

18. The system as recited in claim 14, wherein the policy decision module is configured to request additional authentication information from the user based on the level of confidence by:
   providing a list of one or more additional authentication options to the client device such that a set of one or more of the additional authentication options will make the user eligible to access the protected data item; and receiving one or more additional authentication options.

19. The system as recited in claim 14, further comprising an authentication challenge module configured to send authentication challenges to the client device in accordance with the level of confidence.

20. The system as recited in claim 14, further comprising an authentication challenge module configured to request additional authentication information by contacting a third party to verify an identity of the user.

21. The system as recited in claim 14, wherein the authentication manager module is further configured to send to the client device one or more of a decryption key and obfuscation inversion function corresponding to an appropriate level of redaction of the protected data item, wherein the appropriate level of redaction is based on the access history of the user of the client device and the context of the client device.

22. The system as recited in claim 14, further comprising a data protection server including the policy decision module and the authentication manager module.

23. A system for accessing one or more protected data items, comprising:

a hardware processor;

a policy decision module configured to determine, using the processor, a level of confidence that a user of a mobile device is an authorized user of the mobile device to determine eligibility of the user to access the one or more protected data items using a data protection server in response to a request to access the one or more protected data items, wherein the level of confidence is based on one or more of a context of the client device, an authentication history of the client device, and an access history of the user of the client device, wherein the context of the client device includes one or more of a current location, a location history, a history of compromises, an ownership status, an operating system, a version of the operating system, an application stored on the client device, a patch status, suspected malware, and a security status of a network connected to the client device; and an authentication manager module configured to provide access to the one or more protected data items to the client device using the data protection system in accordance with the level of confidence, such that a level of confidence needed to access the one or more protected data items is based upon sensitivity of the one or more protected data items, wherein a unique encryption key is employed for each application of a protection technique on each of the one or more protected data items.

* * * * *